(12) United States Patent
Georgis et al.

(10) Patent No.: US 8,040,399 B2
(45) Date of Patent: Oct. 18, 2011

(54) SYSTEM AND METHOD FOR EFFECTIVELY OPTIMIZING ZOOM SETTINGS IN A DIGITAL CAMERA

(75) Inventors: Nikolaos Georgis, San Diego, CA (US); Fredrik Carpio, San Diego, CA (US); Paul Hwang, Burbank, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 708 days.

(21) Appl. No.: 12/148,994

(22) Filed: Apr. 24, 2008

(65) Prior Publication Data
US 2009/0268060 A1    Oct. 29, 2009

(51) Int. Cl.
*H04N 5/262* (2006.01)
(52) U.S. Cl. ............ 348/240.1; 348/240.2; 348/240.3; 348/240.99; 396/60; 396/76; 396/85; 396/379
(58) Field of Classification Search .................. None
See application file for complete search history.

(56) References Cited

U.S. PATENT DOCUMENTS

| | | | |
|---|---|---|---|
| 7,053,953 B2 | 5/2006 | Belz et al. | |
| 2001/0040630 A1* | 11/2001 | Matsuzaka | 348/240 |
| 2005/0094019 A1 | 5/2005 | Grosvenor et al. | |
| 2006/0269150 A1 | 11/2006 | Lee | |
| 2007/0031136 A1 | 2/2007 | Kakkori | |
| 2007/0291163 A1* | 12/2007 | Yamazaki et al. | 348/363 |
| 2008/0018754 A1* | 1/2008 | Ejima et al. | 348/240.3 |

* cited by examiner

*Primary Examiner* — Jason Chan
*Assistant Examiner* — Yih-Sien Kao
(74) *Attorney, Agent, or Firm* — Gregory J. Koerner; Redwood Patent Law

(57) ABSTRACT

A system and method for effectively optimizing zoom settings in a digital camera includes a digital zoom module that performs a digital zoom function, and an optical zoom module that controls a lens unit of the digital camera to perform an optical zoom function. A depth of field manager performs a zoom-setting optimization procedure to select optimal zoom values for the optical zoom module and the digital zoom module to thereby optimize image quality characteristics of images captured by the camera device.

3 Claims, 10 Drawing Sheets

SYSTEM AND METHOD FOR EFFECTIVELY OPTIMIZING ZOOM SETTINGS IN A DIGITAL CAMERA

BACKGROUND SECTION

1. Field of the Invention

This invention relates generally to techniques for capturing image data, and relates more particularly to a system and method for effectively optimizing zoom settings in a digital camera.

2. Description of the Background Art

Implementing effective methods for capturing image data is a significant consideration for designers and manufacturers of contemporary electronic devices. However, effectively capturing image data with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively captures digital image data may benefit from an effective implementation because of the large amount and complexity of the digital data involved.

Due to growing demands on system resources and substantially increasing data magnitudes, it is apparent that developing new techniques for analyzing image data is a matter of concern for related electronic technologies. Therefore, for all the foregoing reasons, developing effective systems for capturing image data remains a significant consideration for designers, manufacturers, and users of contemporary electronic devices.

SUMMARY

In accordance with the present invention, a system and method are disclosed for effectively optimizing zoom settings in a digital camera. In one embodiment, in order to optimize depth of field characteristics of a captured image, a depth of field (DOF) manager may perform an optical zoom function with an optical zoom module to physically adjust a lens unit of the digital camera to an optimal optical zoom value. The DOF manager may then utilize a digital zoom module to perform a digital zoom function to compensate for the foregoing optical zoom function to thereby produce an image that possesses the same apparent zoom characteristics as initially desired by a camera user.

In one embodiment of the present invention, the DOF manager initially reads an optical zoom value for the optical zoom module. The DOF manager also reads a current target distance to a desired target object. Then, the DOF manager accesses optimal zoom values (an optical-zoom value and a corresponding digital-zoom value) from a zoom-value lookup table that was created previously according to specified criteria. The DOF manager then applies the optimal zoom values from the lookup table to the optical zoom module and the digital zoom module. Finally, an image sensor of the digital camera captures optimized images with the optimized zoom values (optical zoom value and digital zoom value). The present invention therefore provides an improved system and method for effectively optimizing zoom settings in a digital camera.

DETAILED DESCRIPTION

The present invention relates to an improvement in image data capture techniques. The following description is presented to enable one of ordinary skill in the art to make and use the invention and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for effectively optimizing zoom settings in a digital camera, and includes a digital zoom module that performs a digital zoom function, and an optical zoom module that controls a lens unit of the digital camera to perform an optical zoom function. A depth of field manager performs a zoom-setting optimization procedure to select optimal zoom values for the optical zoom module and the digital zoom module to thereby optimize image quality characteristics of images captured by the camera device.

Figure 1:
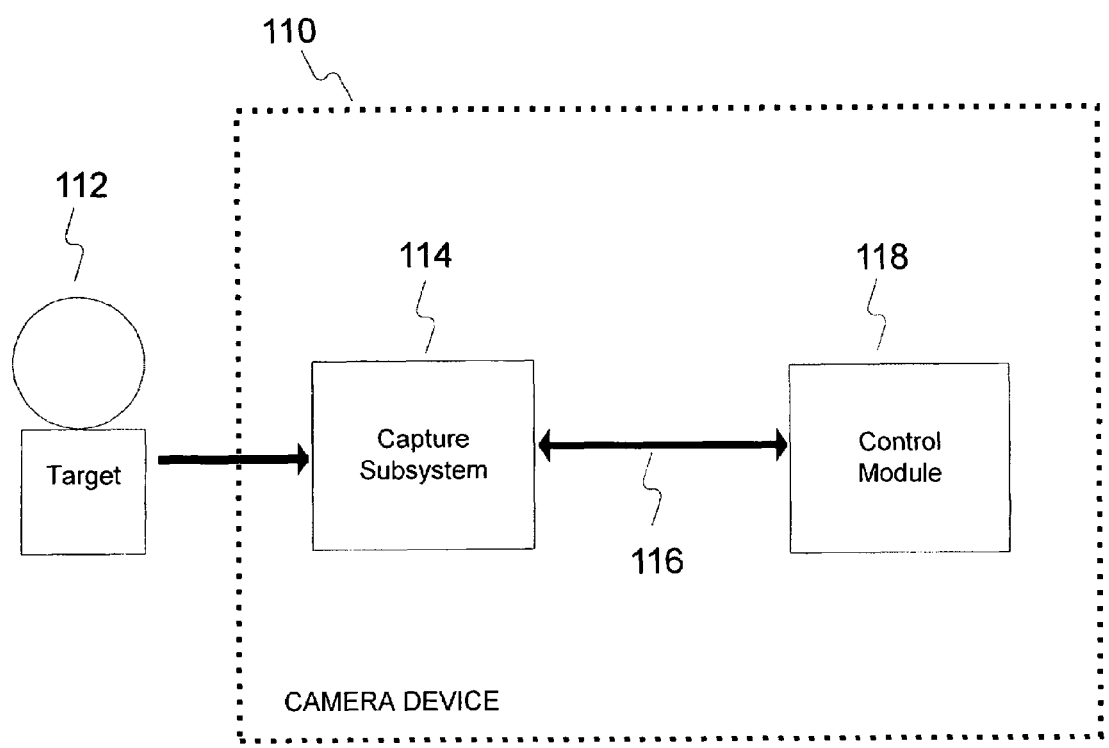
FIG. 1 is a block diagram for one embodiment of a camera device, in accordance with the present invention.

Referring now to FIG. 1, a block diagram for one embodiment of a camera device 110 is shown, in accordance with the present invention. In the FIG. 1 embodiment, camera device 110 may include, but is not limited to, a capture subsystem 114, a system bus 116, and a control module 118. In the FIG. 1 embodiment, capture subsystem 114 may be optically coupled to a photographic target 112, and may also be electrically coupled via system bus 116 to control module 118.

In alternate embodiments, camera device 110 may include other components in addition to, or instead of, certain of those components discussed in conjunction with the FIG. 1 embodiment. In addition, in certain embodiments, the present invention may alternately be embodied in any appropriate type of electronic device other than the camera device 110 of FIG. 1. For example, camera device 110 may alternately be implemented as an imaging device, a computer device, or a consumer electronics device.

In the FIG. 1 embodiment, once a system user has focused capture subsystem 114 on target 112 and requested camera device 110 to capture image data corresponding to target 112, then control module 118 may instruct capture subsystem 114 via system bus 116 to capture image data representing target 112. The captured image data may then be transferred over system bus 116 to control module 118, which may responsively perform various processes and functions with the image data. System bus 116 may also bi-directionally pass various status and control signals between capture subsystem 114 and control module 118.

Figure 2:
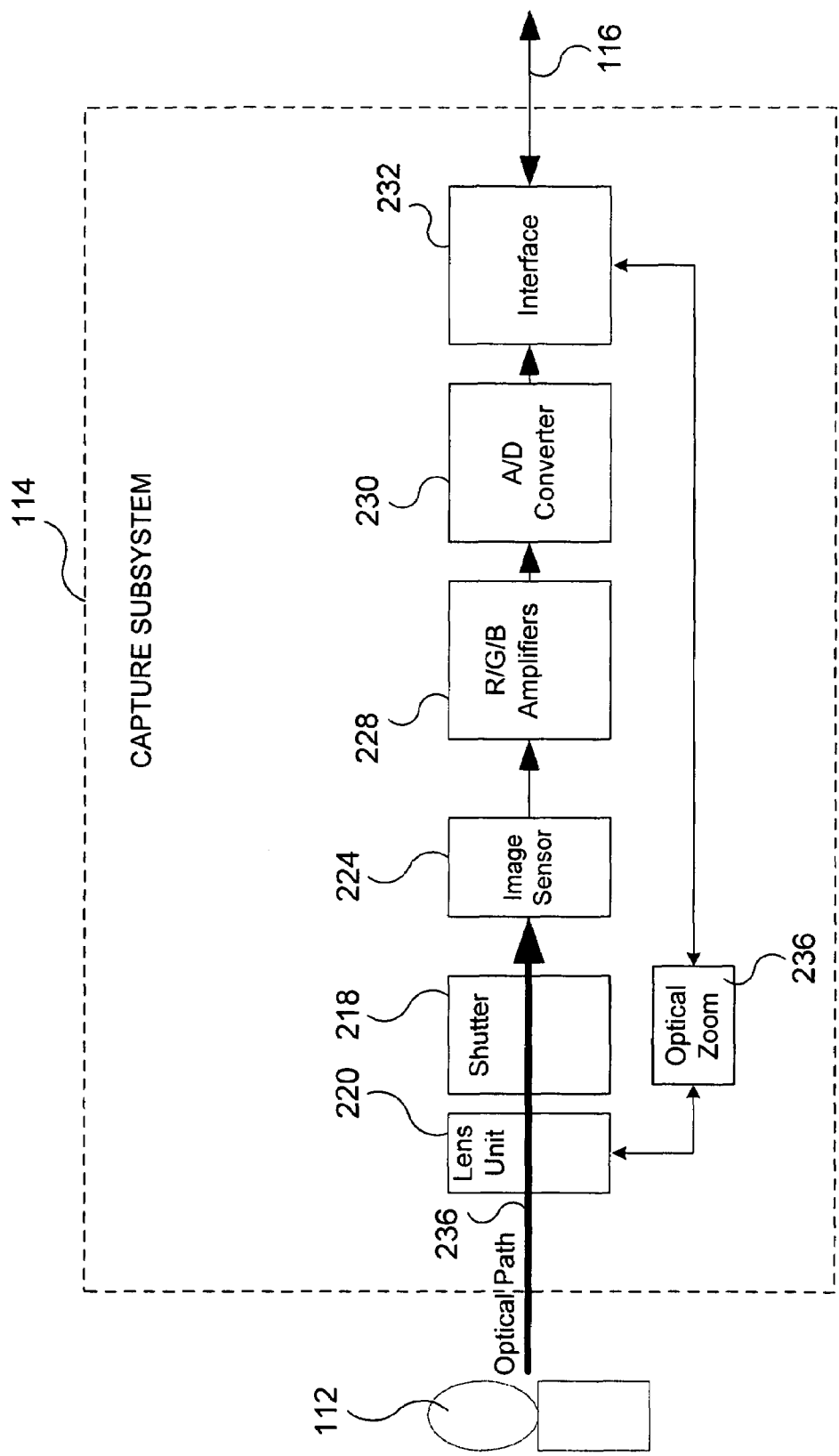
FIG. 2 is a block diagram for one embodiment of the capture subsystem of FIG. 1, in accordance with the present invention.

Referring now to FIG. 2, a block diagram for one embodiment of the FIG. 1 capture subsystem 114 is shown, in accordance with the present invention. In the FIG. 2 embodiment, capture subsystem 114 comprises, but is not limited to, a shutter 218, a lens unit 220, an image sensor 224, red, green, and blue (R/G/B) amplifiers 228, an analog-to-digital (A/D) converter 230, an interface 232, and an optical zoom controller 236. In alternate embodiments, capture subsystem 114 may readily include other components in addition to, or instead of, certain those components discussed in conjunction with the FIG. 2 embodiment.

In the FIG. 2 embodiment, capture subsystem 114 captures image data corresponding to target 112 via reflected light impacting image sensor 224 along optical path 236. Image sensor 224, which may include a charged-coupled device (CCD), may responsively generate a set of image data representing the target 112. The image data may then be routed through red, green, and blue amplifiers 228, A/D converter 230, and interface 232. From interface 232, the image data passes over system bus 116 to control module 118 for appropriate processing and storage. Other types of image capture sensors, such as CMOS or linear arrays are also contemplated for capturing image data in conjunction with the present invention. In the FIG. 2 embodiment, lens unit 220 may be implemented in any effective manner that support a mechanical zoom function that is controlled by optical zoom 236 in response to commands from control module 118 (FIG. 1). The utilization and functionality of capture subsystem is further discussed below in conjunction with FIGS. 5-9.

Figure 3:
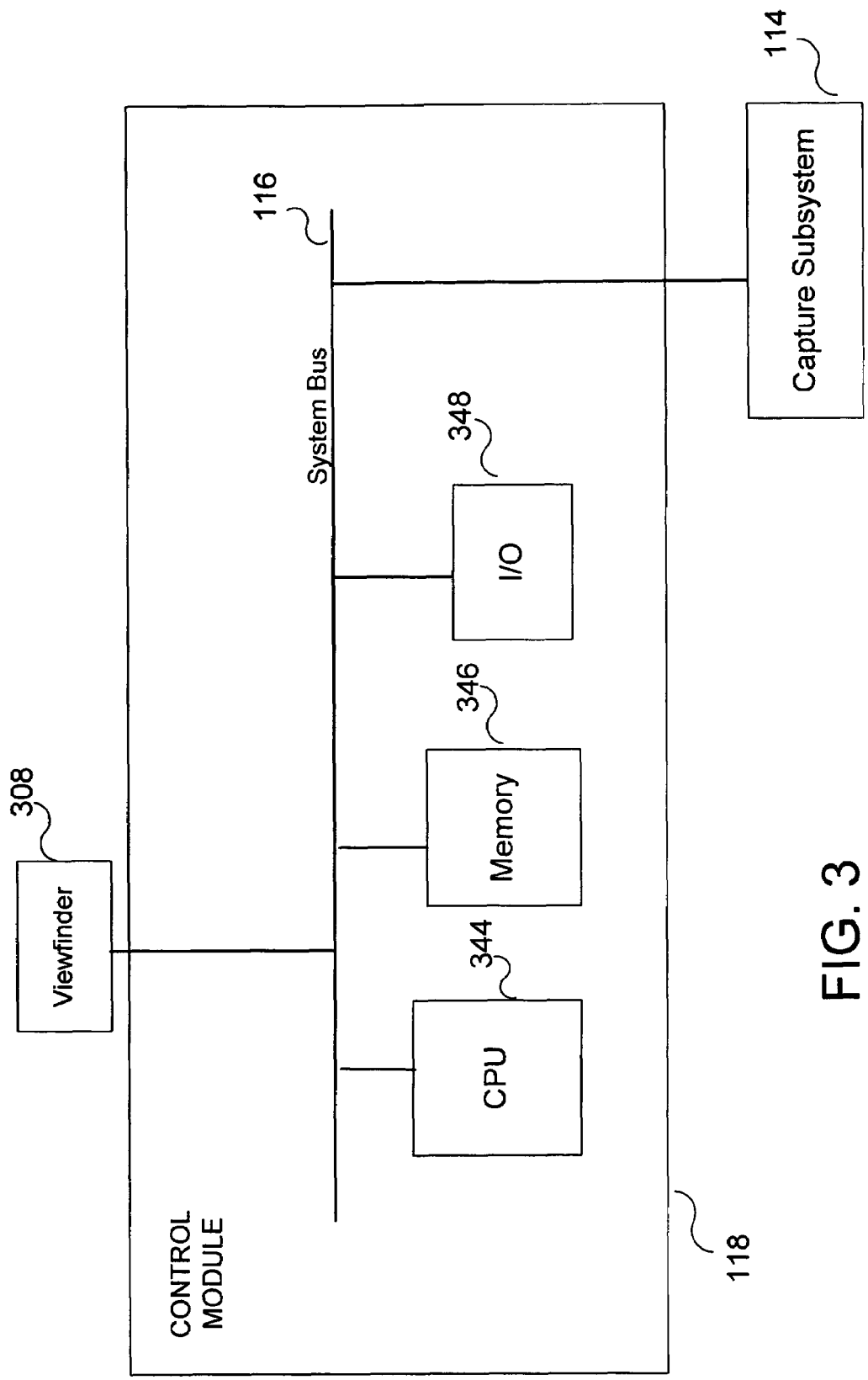
FIG. 3 is a block diagram for one embodiment of the control module of FIG. 1, in accordance with the present invention.

Referring now to FIG. 3, a block diagram for one embodiment of the FIG. 1 control module 118 is shown, in accordance with the present invention. In the FIG. 3 embodiment, control module 118 includes, but is not limited to, a viewfinder 308, a central processing unit (CPU) 344, a memory 346, and one or more input/output interface(s) (I/O) 348. Viewfinder 308, CPU 344, memory 346, and I/O 348 are each coupled to, and communicate, via common system bus 116 that also communicates with capture subsystem 114. In alternate embodiments, control module 118 may include other components in addition to, or instead of, certain of those components discussed in conjunction with the FIG. 3 embodiment.

In the FIG. 3 embodiment, CPU 344 may be implemented to include any appropriate microprocessor device. Alternately, CPU 344 may be implemented using any other appropriate technology. For example, CPU 344 may be implemented to include certain application-specific integrated circuits (ASICs) or other appropriate electronic devices. Memory 346 may be implemented as one or more appropriate storage devices, including, but not limited to, read-only memory, random-access memory, and various types of non-volatile memory, such as floppy disc devices, hard disc devices, or flash memory. I/O 348 may provide one or more effective interfaces for facilitating bi-directional communications between camera device 110 and any external entity, including a system user or another electronic device. I/O 348 may be implemented using any appropriate input and/or output devices. The operation and utilization of control module 118 are further discussed below in conjunction with FIGS. 4 through 9.

Figure 4:
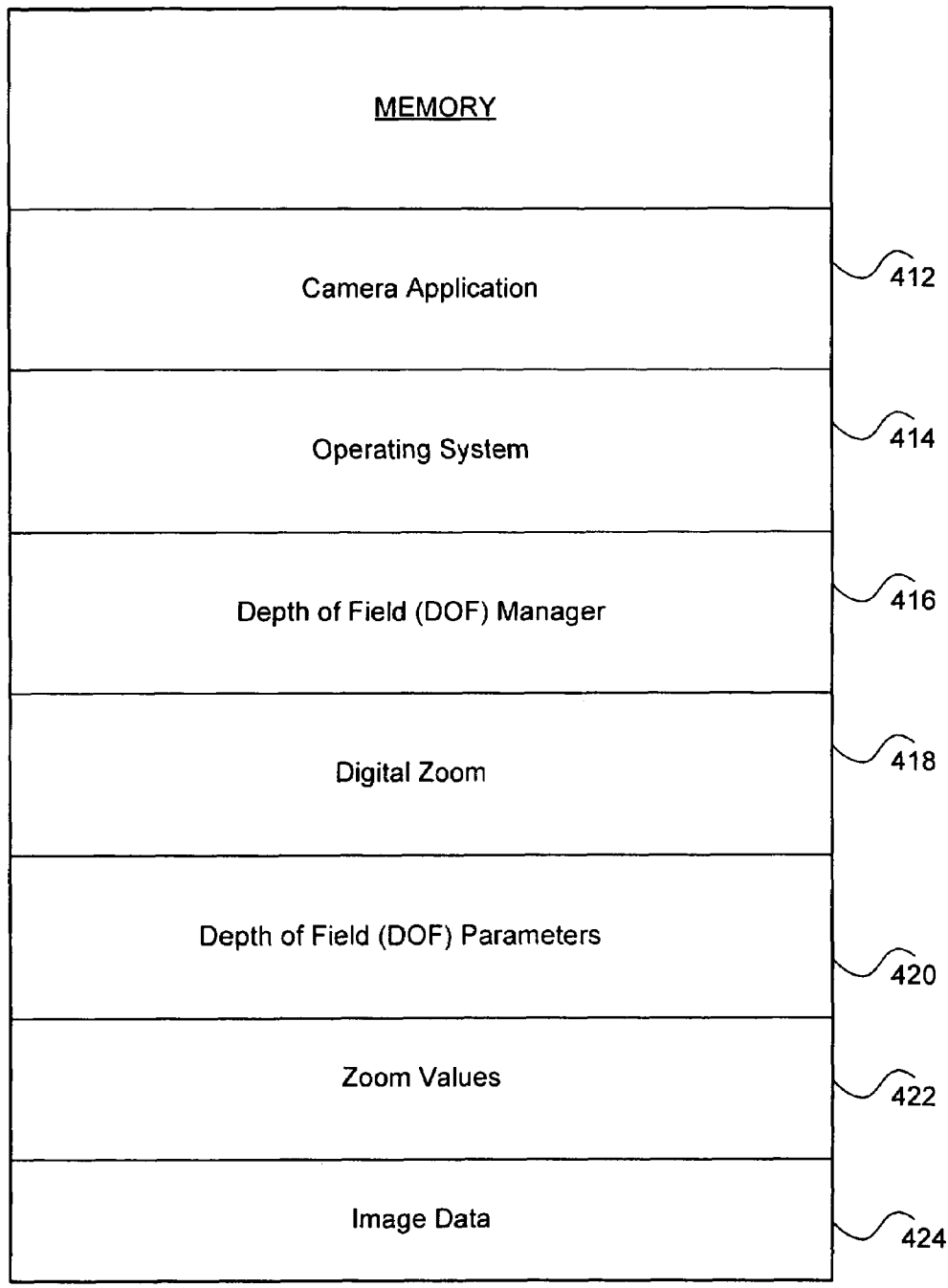
FIG. 4 is a block diagram for one embodiment of the memory of FIG. 3, in accordance with the present invention.

Referring now to FIG. 4, a block diagram for one embodiment of the FIG. 3 memory 346 is shown, in accordance with the present invention. In the FIG. 4 embodiment, memory 346 may include, but is not limited to, a camera application 412, an operating system 414, a depth of field (DOF) manager 416, a digital zoom module 418, depth of field (DOF) parameters 420, zoom values 422, and image data 424. In alternate embodiments, memory 346 may readily include various other components in addition to, or instead of, those components discussed in conjunction with the FIG. 4 embodiment.

In the FIG. 4 embodiment, camera application 412 may include program instructions that are executed by CPU 344 (FIG. 3) to perform various functions and operations for camera device 110. The particular nature and functionality of camera application 412 varies depending upon factors such as the type and particular use of the corresponding camera device 110. In the FIG. 4 embodiment, operating system 414 preferably controls and coordinates low-level functionality of camera device 110.

In accordance with the present invention, DOF manager 416 may control and coordinate a zoom optimization procedure to select optimal zoom values 422 for capturing image data 424. The zoom values 422 may include specific settings for digital zoom 418 and optical zoom 236 (FIG. 2). In the FIG. 4 embodiment, DOF parameters 420 may include any appropriate values or information required by DOF manager 416 to optimize zoom values 422. The utilization of DOF manager 416 to perform zoom optimization procedures is further discussed below in conjunction with FIGS. 5-9.

Figure 5:
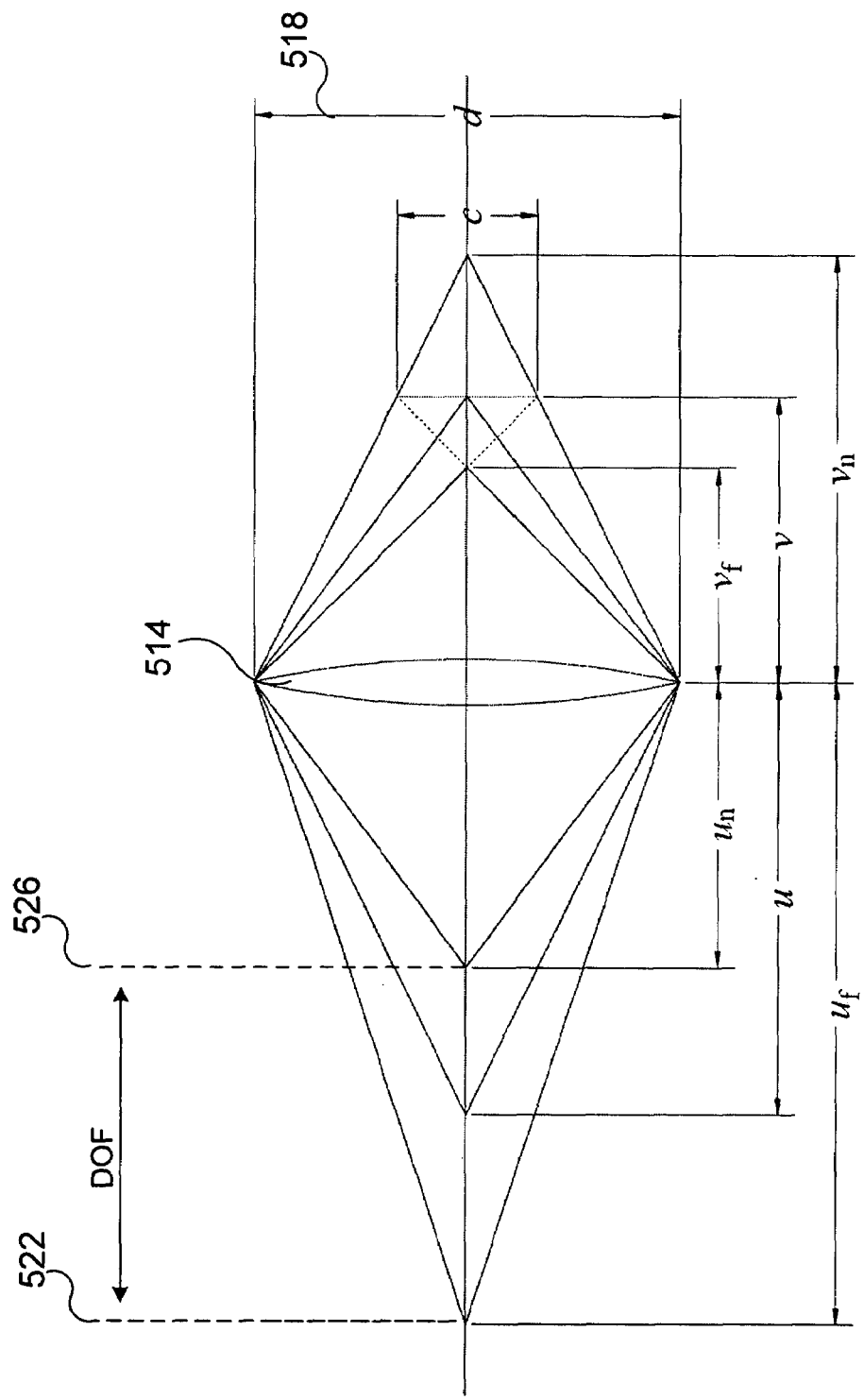
FIG. 5 is a diagram illustrating depth of field, in accordance with one embodiment of the present invention.

Referring now to FIG. 5, a diagram illustrating depth of field (DOF) is shown, in accordance with one embodiment of the present invention. The FIG. 5 diagram is presented for purposes of illustration, and in alternate embodiments, depth of field may include characteristics or parameters in addition to, or instead of, certain of those characteristics or parameters shown in the FIG. 5 example.

In the FIG. 5 embodiment, a lens 514 is shown with various relevant distances and parameters defined. A camera is typically able to precisely focus on only one plane. A point object in any other plane is imaged as a disk rather than a point, and the farther a plane is from the plane of focus, the larger the disk. However, if the disk (known as a blur spot) is sufficiently small, it is indistinguishable from a point, so that a zone of acceptable sharpness exists between two planes on either side of the plane of focus. This zone is known as the depth of field (DOF). The closest plane is the near limit of the DOF, and the farthest plane is the far limit of the DOF. The diameter of a sufficiently small blur spot is known as the circle of confusion.

In the FIG. 5 example, the DOF is shown between near limit 526 (defined by distance $u_n$) and far limit 522 (defined by distance $u_f$). Controlling the size of the aperture controls the size of the blur spot, and the focus determines the position of the DOF. As the size of the aperture is decreased (or the f-number is increased), the size of the defocus blur spot decreases and the DOF increases. However, in low-light environments, the aperture may need to be increased and the shutter speed decreased to obtain enough light for adequately capturing images. For these reasons, DOF may be maximized by operating camera 110 with the zoom value for optical zoom 236 being set (or zoomed out) as far as possible for capturing the desired target object 112.

In the FIG. 5 example, a target object 112 at distance u from lens 514 is in focus (for example, on image sensor 224 of FIG. 2) at focal distance v. Target objects at distances $u_f$ and $u_n$ would be in focus at focal distances $v_f$ and $u_n$ respectively. At focal distance v, they are imaged as blur spots. The depth of field is affected by the aperture stop diameter d. When the blur spot diameter is equal to the circle of confusion c, the near and far limits of the DOF are defined by distances $u_f$ and $u_n$ between vertical axis 522 and vertical axis 526.

In the FIG. 5 example, the DOF may be defined by the following formula:

$$DOF = u_f - u_n = \frac{2Nc(m+1)}{m^2 - \left(\frac{Nc}{f}\right)^2}$$

where $u_f$ is the distance of the far object that is in focus, $u_n$ is the distance of the near object that is in focus, f is the focal length, u is the object distance, v is the image distance, c is the circle of confusion, d is the aperture diameter, m is the image magnification (equal to u/v), and N is the f-number (equal to f/d).

Figure 6:
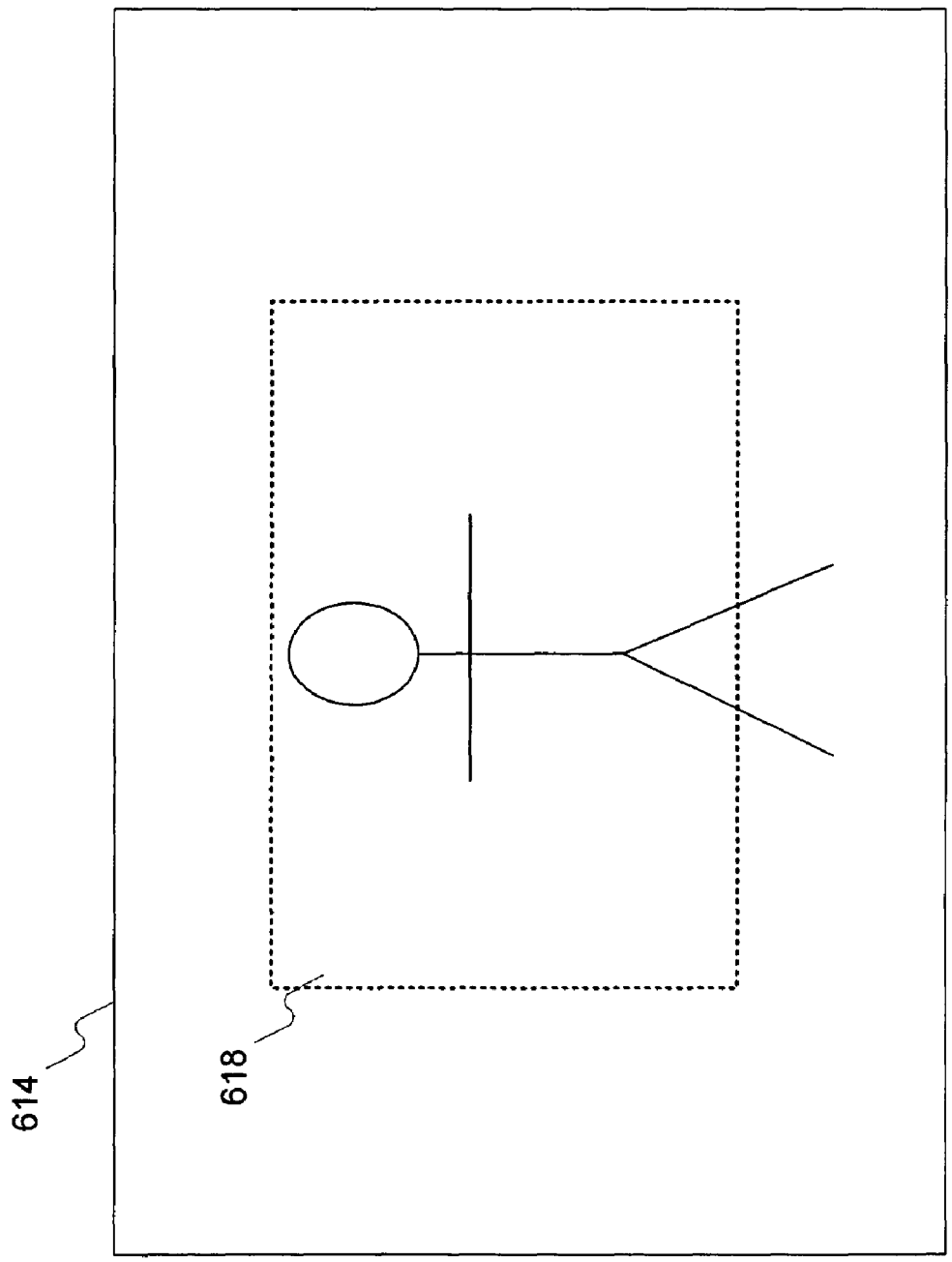
FIG. 6 is a diagram illustrating a digital zoom procedure, in accordance with one embodiment of the present invention.

Referring now to FIG. 6, a diagram illustrating a digital zoom procedure is shown, in accordance with one embodiment of the present invention. In alternate embodiments, the present invention may utilize various other configurations and techniques to implement digital zoom procedures.

In the FIG. 6 example, a full-sized image 614 is shown with an exemplary target object (a person) in the center of the frame. The FIG. 6 example also shows a smaller zoomed-in image 618 that is enclosed a smaller frame demarcated by a dotted line. In the FIG. 6 embodiment, camera 110 may utilize a digital zoom 418 (FIG. 4) to electronically perform a digital zoom procedure upon the image by utilizing any effective techniques. For example, in certain embodiments, digital zoom 418 may crop or remove the area of full-sized image 614 that falls outside of zoomed-in image 618. Digital zoom 418 may then increase the apparent size of the zoomed-in image 418 to match the original size of full-sized image 614 by utilizing any appropriate techniques. For example, in certain embodiments, digital zoom 418 may duplicate adjacent pixels from zoomed-in image 618 until enough pixels are present to populate zoomed-in image 618 as a full-sized image.

As discussed above in conjunction with FIG. 5, in order to optimize depth of field characteristics of a captured image, a DOF manager 416 (FIG. 4) may advantageously zoom out (lengthen the focal length) of lens unit 220 (FIG. 2) to an optimal optical zoom value. In accordance with the present invention, DOF manager 416 may then effectively utilize digital zoom 416 to compensate for the foregoing optical zoom-out procedure by performing a digital zoom-in procedure with digital zoom 418 to thereby produce a zoomed-in image 618 that possesses the same apparent zoom characteristics as initially desired by a camera user. The derivation of optimal zoom settings is further discussed below in conjunction with FIGS. 7-9.

Figure 7:
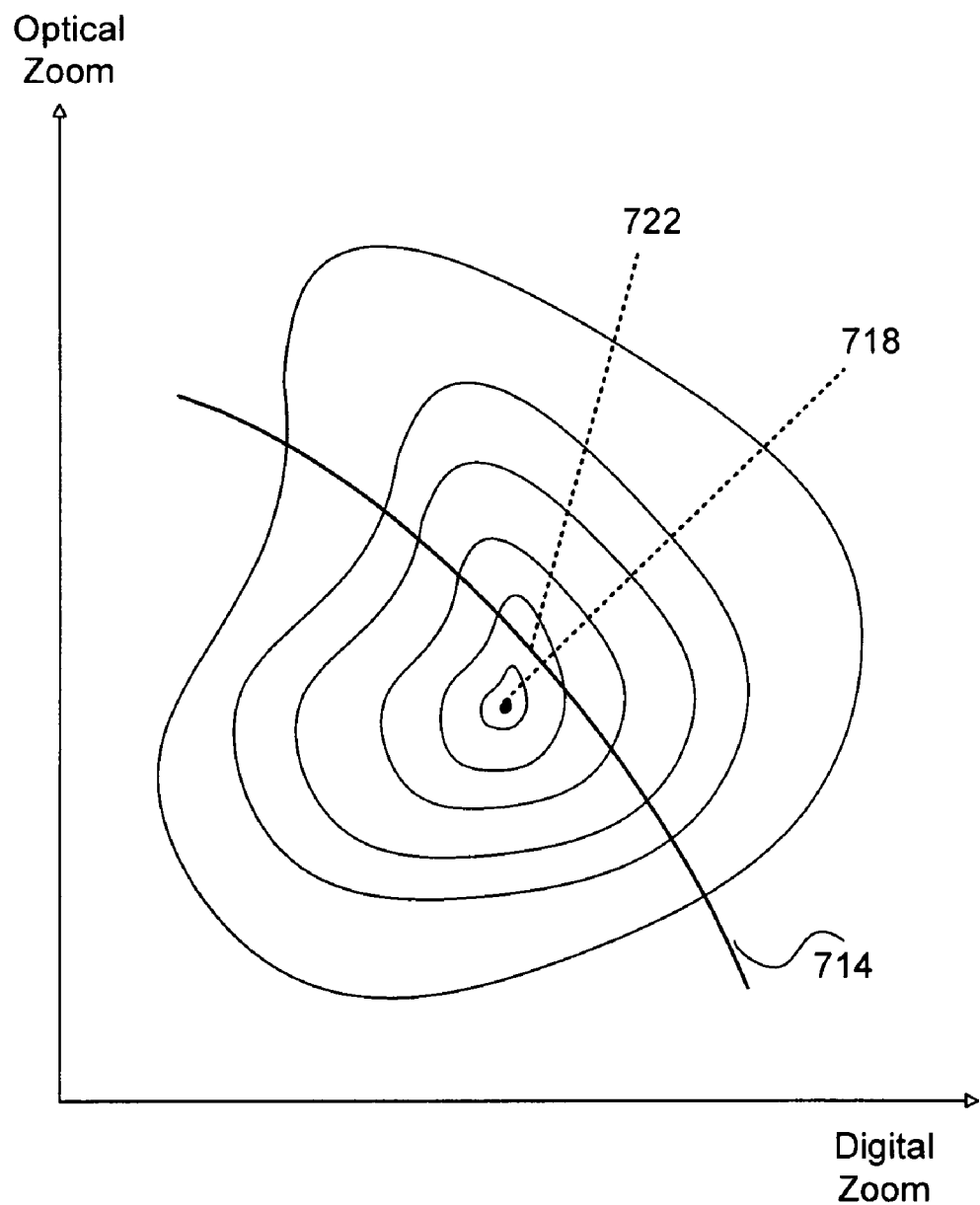
FIG. 7 is a graph illustrating optimized zoom values, in accordance with one embodiment of the present invention.

Referring now to FIG. 7, a graph illustrating optimized zoom values is shown, in accordance with one embodiment of the present invention. The FIG. 7 embodiment is presented for purposes of illustration, and in alternate embodiments, zoom values may be optimized with techniques and configurations in addition to, or instead of, certain of those techniques and configurations discussed in conjunction with the FIG. 7 embodiment.

In the FIG. 7 graph, optical zoom values for optical zoom 236 (FIG. 2) are shown on a vertical axis, and digital zoom values for digital zoom 418 (FIG. 4) are shown on a horizontal axis. A group of six progressively smaller contours are shown in the FIG. 7 example as being approximately concentric. In other embodiments, any other number of contours or shapes may alternately be utilized. In the FIG. 7 embodiment, each of the contours represents a different level of image quality for an image captured at a given object distance. In the FIG. 7 embodiment, the outermost contour represents the worst image quality. The image quality increases gradually through the series of adjacent contours until an optimal image quality is reached in the center contour.

The FIG. 7 graph depicts both an unconstrained solution and a constrained solution for identifying the optimal zoom settings for optical zoom 236 and digital zoom 418. The optimal zoom settings may be identified by applying any effective techniques or criteria. For example, optimal zoom settings may be selected to correspond to optimal image quality characteristics (such as optimal image detail or optimal depth of field) for captured images. In the FIG. 7 embodiment, an unconstrained solution identifies the optimal zoom settings as the dark region 718 in the center contour. For a constrained solution, a curve 714 illustrates all possible zoom setting pairs (optical and digital) that satisfy an apparent desired zoom setting from a camera user. The optimal zoom settings are identified at the location 722 where curve 714 touches the highest-level contour. Additional techniques for identifying and utilizing optimal zoom settings are further discussed below in conjunction with FIGS. 8-9.

Figure 8A:
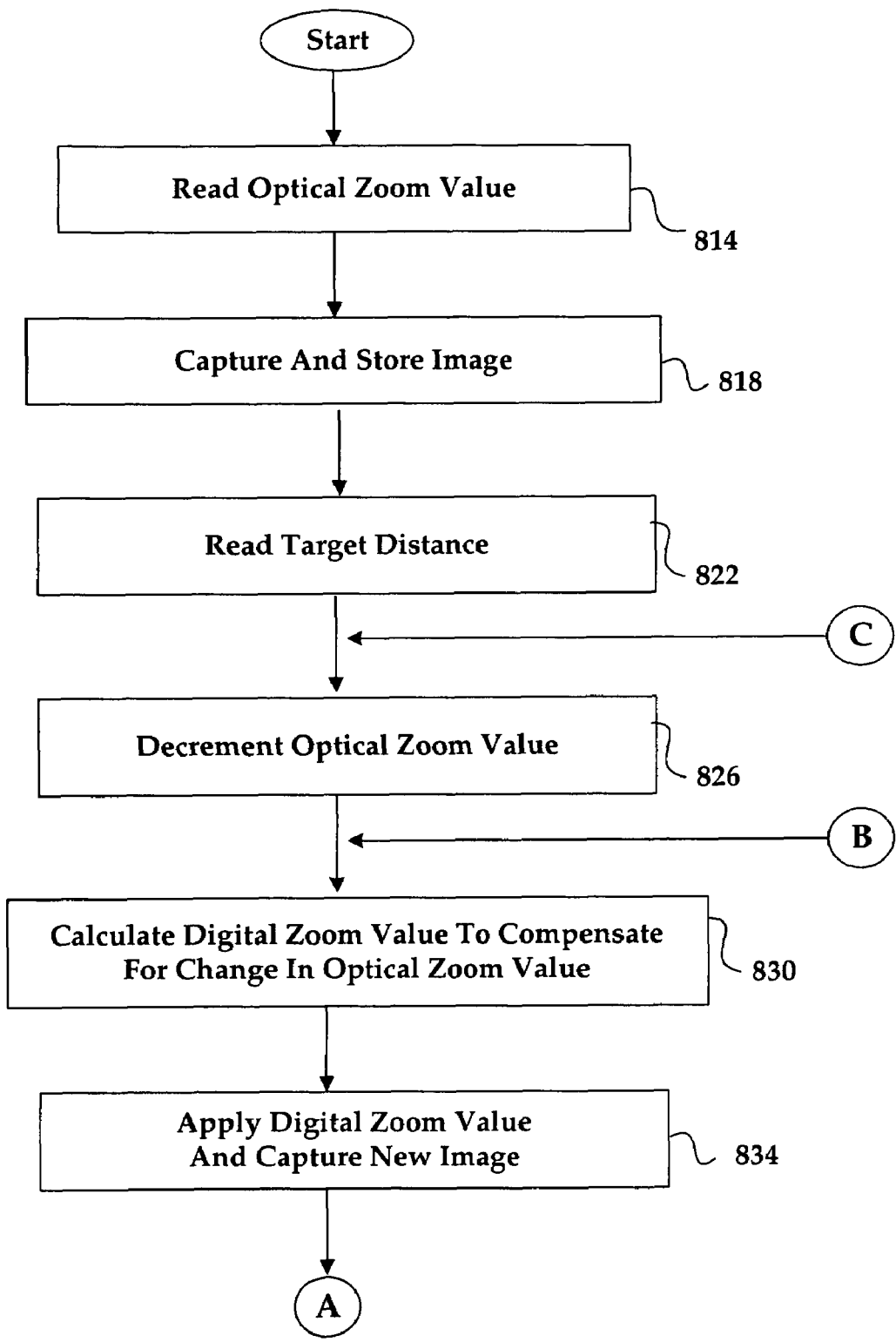
FIGS. 8A-8B are a flowchart of method steps for optimizing depth of field, in accordance with a first embodiment of the present invention.
Figure 8B:
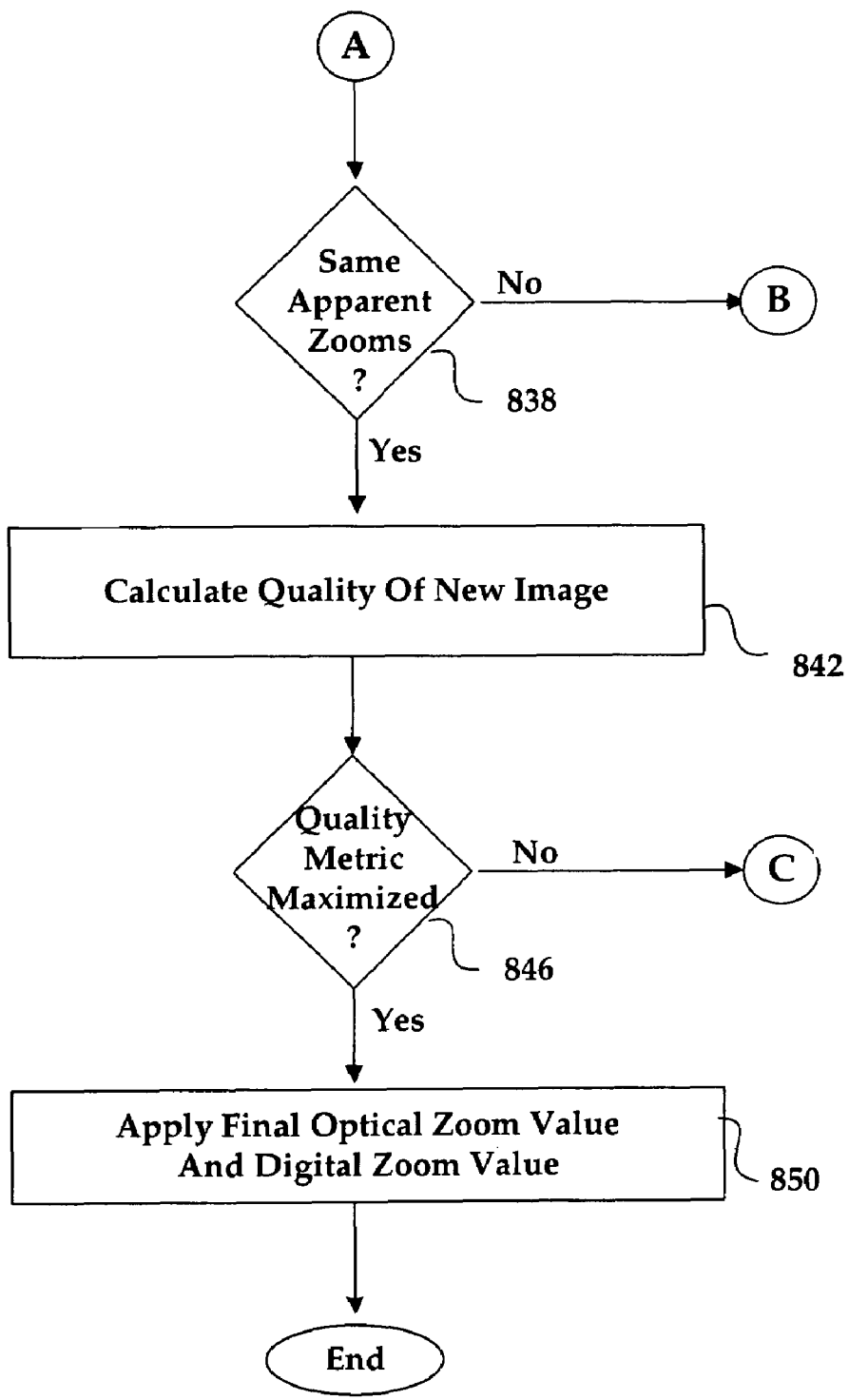

Referring now to FIGS. 8A-8B, a flowchart of method steps for optimizing depth of field is shown, in accordance with a first embodiment of the present invention. The FIG. 8 embodiment is presented for purposes of illustration, and in alternate embodiments, the present invention may readily utilize various other steps and sequences than those discussed in conjunction with the FIG. 8 embodiment.

In step 814 of FIG. 8A, a depth of field (DOF) manager 416 initially reads an optical zoom value for an optical zoom 236 that controls a lens unit 220 of a camera device 110. In step 818, an image sensor 224 of the camera device 110 captures and stores image data 424 corresponding to a target object 112. In step 822, DOF manager 416 reads a current target distance to the target object 112. Then, in step 826, the DOF manager 416 instructs optical zoom 236 to decrement an optical zoom value by a zoom-out value of $-\Delta Z_o$.

In step 830, DOF manager 416 calculates a zoom-in value $+\Delta Z_d$ for incrementing a digital zoom value to thereby compensate for the decrement in the optical zoom value from foregoing step 826. In step 834, DOF manager 416 applies the new digital zoom value to digital zoom 418, and image sensor 224 captures a new image with the updated zoom values (optical zoom value and digital zoom value). The FIG. 8A process then advances to step 838 of FIG. 8B through connecting letter "A."

In step 838, DOF manager 416 determines whether the apparent zoom characteristics of the immediately-preceding zoom values and the current updated zoom values (from step 834) are the same. If the apparent zoom characteristics are not the same, then the FIG. 8B process returns to step 830 of FIG. 8A through connecting letter "B." However, if the apparent zoom characteristics are the same in step 838, then in step

842, DOF manager 416 calculates the quality characteristics of the new image from step 834 by utilizing any appropriate techniques and criteria.

In step 846, DOF manager 416 determines whether the quality metric for the new image is maximized by utilizing any effect methods. For example, in certain embodiments, the contour graph method of FIG. 7 may be utilized. If the quality metric for the new image is not maximized, then the FIG. 8B process returns to step 826 of FIG. 8A through connecting letter "C." However, if the quality metric for the new image is maximized in step 846, then in step 850, DOF manager 416 may apply the final optical zoom value and the final digital zoom value for utilization by camera device 110.

Figure 9:
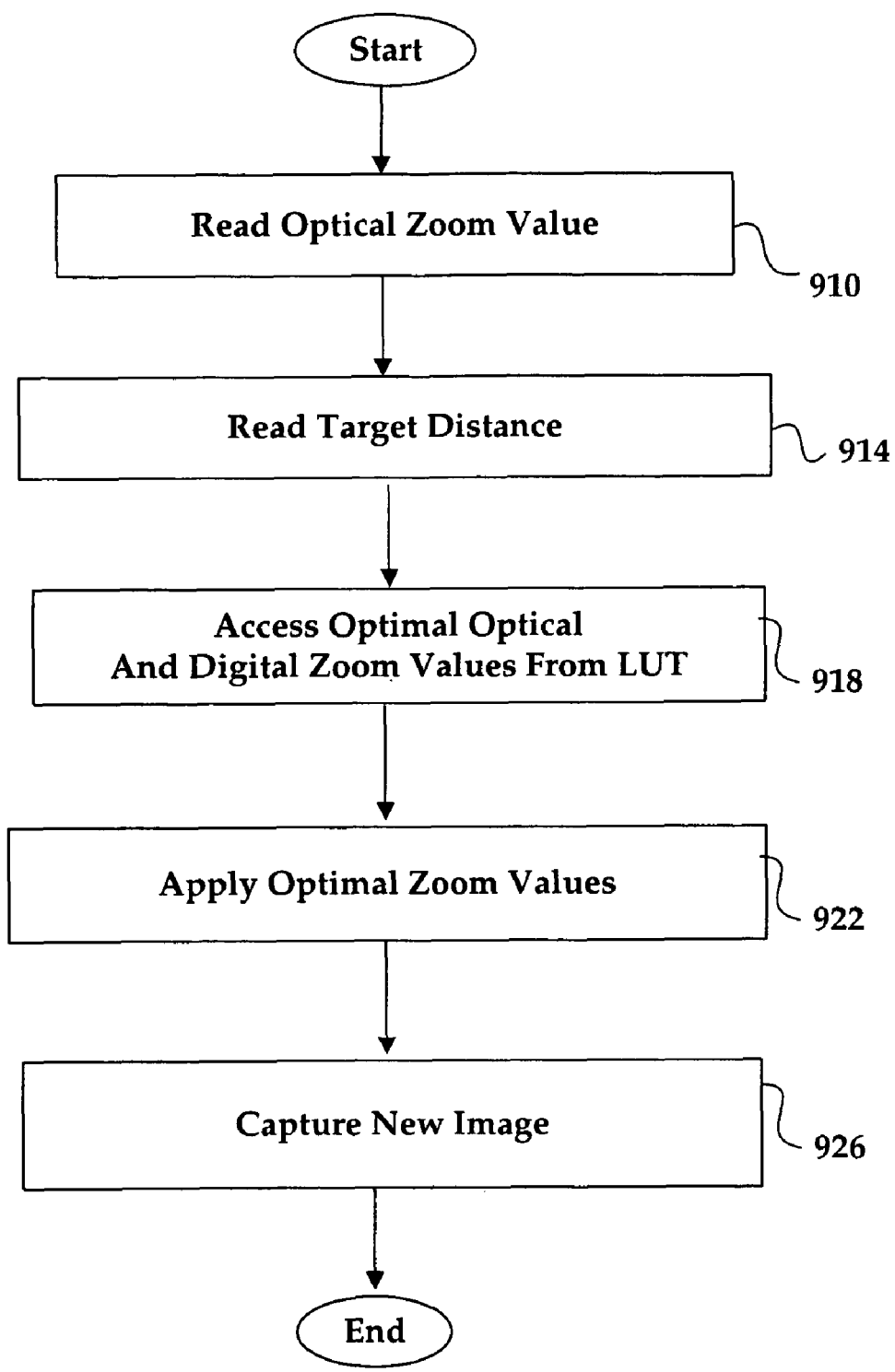
FIG. 9 is a flowchart of method steps for optimizing depth of field, in accordance with a second embodiment of the present invention.

Referring now to FIG. 9, a flowchart of method steps for optimizing depth of field is shown, in accordance with a second embodiment of the present invention. The FIG. 9 embodiment is presented for purposes of illustration, and in alternate embodiments, the present invention may readily utilize various other steps and sequences than those discussed in conjunction with the FIG. 9 embodiment.

In the FIG. 9 embodiment, in step 910, a depth of field (DOF) manager 416 initially reads an optical zoom value for an optical zoom 236 that controls a lens unit 220 of a camera device 110. In step 914, DOF manager 416 reads a current target distance to the target object 112. Then, in step 918, the DOF manager 416 accesses optimal zoom values (an optical-zoom value and a corresponding optimal digital-zoom value) from a zoom-value lookup table (LUT) that was created previously according to specified criteria. In the FIG. 9 embodiment, the optimal zoom values may be based upon relevant camera parameters including, but not limited to, the initial optical zoom value set by the camera user and the current target distance to a desired target object 112. In step 922, DOF manager 416 applies the optimal zoom values from the LUT to optical zoom 236 and digital zoom 418, respectively. Finally, in step 926, an image sensor 224 captures a new image with the optimized zoom values (optical zoom value and digital zoom value). The FIG. 9 process may then terminate. The present invention therefore provides an improved system and method for effectively optimizing zoom settings in a digital camera.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for optimizing zoom settings in a camera device, comprising:
    an optical zoom that controls a lens unit of said camera device to perform an optical zoom function;
    a digital zoom that performs a digital zoom function; and
    a DOF manager that performs a zoom-setting optimization procedure to select optimal zoom values for said optical zoom and said digital zoom to thereby optimize image quality characteristics of images captured by said camera device, said DOF manager selecting said optimal zoom values by calculating and evaluating image quality contours corresponding to said images, said optimal zoom values including an optimal optical-zoom value and an optimal digital-zoom value, said DOF manager utilizing a constrained solution for identifying said optimal zoom values in said image quality contours.

2. A system for optimizing zoom settings in a camera device, comprising:
    an optical zoom that controls a lens unit of said camera device to perform an optical zoom function;
    a digital zoom that performs a digital zoom function; and
    a DOF manager that performs a zoom-setting optimization procedure to select optimal zoom values for said optical zoom and said digital zoom to thereby optimize image quality characteristics of images captured by said camera device, said zoom-setting optimization procedure utilizing on-line techniques to select said optimal zoom values, said DOF manager reading an initial optical zoom value set by a camera user, said DOF manager also reading a target distance for a target object with respect to said camera device, said camera device capturing and storing an initial image, said DOF manager performing an iterative procedures to produce updated zoom values, said iterative procedures decrementing an optical zoom value for said optical zoom, incrementing a digital zoom value for said digital zoom to compensate for decrementing said optical zoom value, said camera device utilizing said updated zoom values to capture evaluation images.

3. The system of claim 2 wherein said DOF manager repeats said iterative procedures until said image quality characteristics are optimized, said camera device then capturing final optimized images.

* * * * *